(12) United States Patent
Tran et al.

(10) Patent No.: US 8,680,777 B2
(45) Date of Patent: Mar. 25, 2014

(54) VERSATILE ZERO-VOLTAGE SWITCH RESONANT INVERTER FOR INDUSTRIAL DIELECTRIC BARRIER DISCHARGE GENERATOR APPLICATIONS

(75) Inventors: Ken Tran, North Chelmsford, MA (US); Xing Chen, Lexington, MA (US); Russell L. Newman, South Hamilton, MA (US); Franklin Lee, Framingham, MA (US)

(73) Assignee: MKS Instruments, Inc., Andover, MA (US)

( * ) Notice: Subject to any disclaimer, the term of this patent is extended or adjusted under 35 U.S.C. 154(b) by 184 days.

(21) Appl. No.: 13/431,521

(22) Filed: Mar. 27, 2012

(65) Prior Publication Data

US 2013/0257311 A1    Oct. 3, 2013

(51) Int. Cl.
*H05B 41/16*  (2006.01)
*H05B 41/24*  (2006.01)

(52) U.S. Cl.
USPC ........... 315/279; 315/291; 315/307; 315/311; 315/326

(58) Field of Classification Search
None
See application file for complete search history.

(56) References Cited

U.S. PATENT DOCUMENTS

| 6,445,137 | B1 * | 9/2002 | Okamoto et al. | 315/246 |
| 7,956,547 | B2 * | 6/2011 | Maeda et al. | 315/205 |
| 2007/0108040 | A1 | 5/2007 | Elkin et al. | |

OTHER PUBLICATIONS

Alonso, J. M., et al., "Low-Power High-Voltage High-Frequency Power Supply for Ozone Generation," Mar./Apr. 2004, IEEE Transactions on Industry Applications, vol. 40, No. 2, pp. 414-421.
Changsheng, H., et al., "A Closed-Loop Control for the Power Source of the Ozonizer," 2004, 35th Annual IEEE Power Electronics Specialists Conference, Aachen, Germany, pp. 3984-3987.
Koudriavtsev, O., et al., "A Novel Pulse-Density-Modulated High-Frequency Inverter for Silent-Discharge-Type Ozonizer," Mar./Apr. 2002, IEEE Transactions on Industry Applications, vol. 38, No. 2, pp. 369-378.
Tran, K., et al., "A New Power Supply to Ignite and Sustain Plasma in a Reactive Gas Generator," Feb. 2008, IEEE 23rd Annual Applied Power Electronics Conference and Exposition, APEC 2008, pp. 1885-1892.

* cited by examiner

*Primary Examiner* — Anh Tran
(74) *Attorney, Agent, or Firm* — Saliwanchik, Lloyd & Eisenschenk, P.A.

(57) ABSTRACT

A power system for a dielectric barrier discharge system, such as used for generating ozone, can include a full bridge inverter stage and parallel resonant tank outputting a signal for powering a dielectric barrier discharge cell stack. The inverter stage is controlled using a combination of pulse width modulation (PWM) and frequency modulation (FM) to enable soft switching through all load conditions—from full load to light load. A current control loop error amplifier compensator can provide a duty cycle adjustment signal to a phase shift PWM controller chip that generates the switching signals for the inverter stage. A feedback signal is also used to adjust a clock frequency time constant of the PWM controller chip to provide the FM. In one embodiment, the feedback signal is an output of an inverting amplifier connected at an output of the current control loop error amplifier compensator.

20 Claims, 12 Drawing Sheets

VERSATILE ZERO-VOLTAGE SWITCH RESONANT INVERTER FOR INDUSTRIAL DIELECTRIC BARRIER DISCHARGE GENERATOR APPLICATIONS

BACKGROUND OF THE INVENTION

Ozone is used for many industrial and semiconductor processing applications including, for example, cleaning semiconductor wafers and the process chambers of semiconductor processing equipment; producing insulating films on semiconductor wafers; and disinfecting water, food, and other consumable or industrial products.

One technique for ozone generation involves a dielectric barrier discharge, where high purity oxygen is exposed to an electrical discharge created by the application of high voltage AC power. The electrical discharge breaks down the oxygen molecules into their atomic state, allowing the oxygen to recombine into a mixture of ozone ($O_3$) and oxygen ($O_2$). For this technique, ozone concentration is proportional to the output power of the ozone generating system. Although increasing output power increases ozone concentration, expectations of performance and reliability and limitations on space provide constraints that are often in opposition.

BRIEF SUMMARY

A power system and power control technique for ozone generators and other dielectric barrier discharge systems are described herein.

According to certain embodiments, a power system is provided having a dual resonant inverter power stage using a parallel resonant topology instead of the traditional hard switching topology; and a combined pulse width modulation (PWM) and frequency modulation (FM) control scheme to achieve superior dynamic range and stability under any operations even at light load.

A power system, according to one embodiment, includes an inverter stage providing a signal to a resonant tank and transformer that ultimately supplies a high voltage AC signal to one or more dielectric barrier discharge cells; and a feedback control circuit that provides the switching signals to the inverter stage. The inverter stage can be a full bridge operated with a phase shift Zero Voltage Switch (ZVS) and PWM combined with FM control via the feedback control circuit.

According to one aspect of the invention, the power system and power control technique enable increased output power while providing the ability to operate from below the output power required for generating ozone through full power. In one embodiment, output power of a system operating in a range of 20 kHz to 40 kHz is increased from 5 kW to 10 kW, while providing the capability to operate at about 1% of the power system's maximum output up to full power (note: 5% ozone concentration of a 5 kW system's maximum output is ~250 W output power). In a specific embodiment, two power trains, each capable of 5 kW output power, are used to achieve the 10 kW output power.

In a further aspect of the invention, the power system and power control technique are accomplished without increasing the size of previous systems. In one embodiment, the power system fits into a smaller space as compared to traditional non-resonant power converters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DISCLOSURE

Techniques and circuits are disclosed herein that enable improved control and power output for dielectric barrier dischargers, including ozone generators.

According to an embodiment of the invention, a power system and power control technique is provided that enables increased output power while providing the ability to operate from below the output power required for generating ozone through full power. In accordance with a specific implementation of the subject invention, a power system frequency range of 20-40 kHz and output power of 10 kW with control to as low as ~1% of 10 kW is provided. In a specific embodiment, two power trains, each capable of 5 kW output power, are used to achieve the 10 kW output power.

Figure 1A:
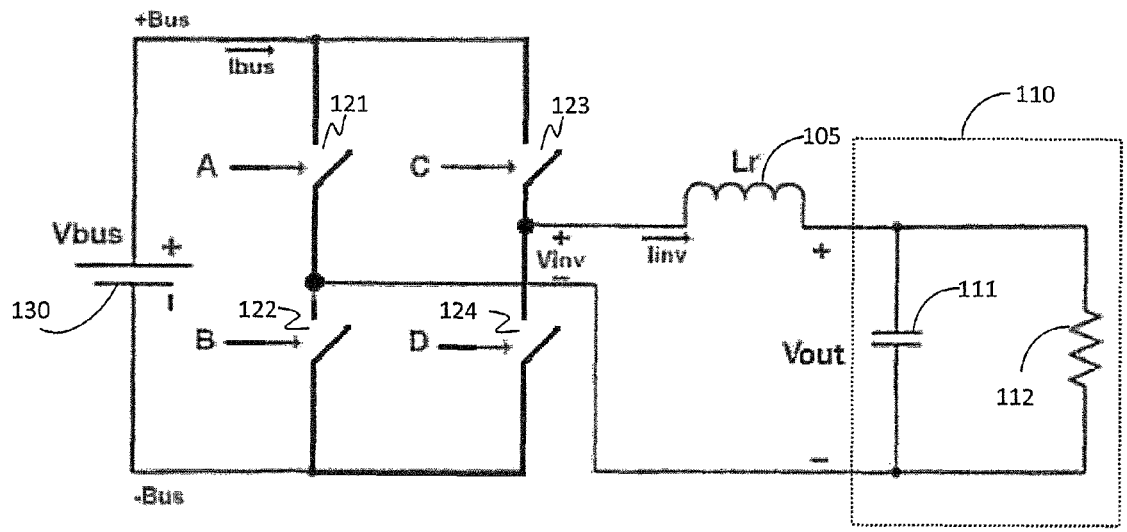
FIG. 1A is a basic diagram of a power stage for a dielectric barrier discharger in accordance with an embodiment of the invention.

FIG. 1A illustrates a basic diagram of a power stage for a dielectric barrier discharger in accordance with an embodiment of the invention. In the power stage shown in FIG. 1A, the four switches 121, 122, 123, and 124 are arranged as a full bridge to convert an incoming DC bus voltage input (Vbus) into a sinusoidal waveform through a parallel resonant tank network represented by resonant inductor Lr 105 and the ozone cell stack 110. The switches (121, 122, 123, and 124) can be any suitable switch, including, but not limited to, bipolar junction transistors (BJTs); insulated gate bipolar transistors (IGBTs); and field effect transistors (FETs), including MOSFETs (metal oxide semiconductor field effect transistors) and high electron mobility transistors (HEMTs).

A resonant tank (provided by the inductor 105 alone or in combination with the capacitor 111 of the load 110) receives the AC voltage from the full-bridge power source and provides a resonant (or substantially resonant) AC voltage in the form of a high voltage sine wave of controlled amplitude to the dielectric barrier discharge cell 110. A transformer (not shown in the diagram) can be included to step up the signal to the desired level. The effects of the transformer can be included in the simplified model by representing Vout as Vout/N, where N is the transformer turn ration.

The cell(s) (or load) 110, of the dielectric barrier discharger can be modeled by the parallel capacitor 111 and resistor 112. Although the capacitor 111 is shown as part of the cell 110, the capacitance of this modeled capacitor may include a separate individual capacitor in addition to the natural capacitance of the cell.

Figure 2A:
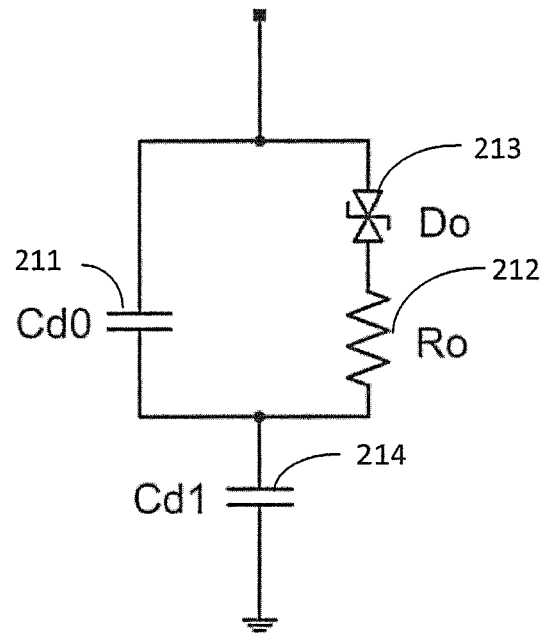
FIG. 2A is an equivalent electrical model of an ozone cell stack.

FIG. 2A shows an electrical circuit model of an ozone cell stack that accounts for the voltage required at the output before ozone can be generated. In particular, a voltage clamp Do 213 (not shown in the basic diagram of FIG. 1A) can be included in series with the resistor 212 (modeled as resistor 112 of FIG. 1A) when modeling a dielectric barrier discharger cell that generates ozone. Because ozone concentration is proportional to the output power, an ozone cell can be modeled by the resistor 212 in series with the voltage clamp 213 (see also, for example, the resistor 312 and voltage clamp 313 shown in FIG. 3). In operation, ozone can be generated after the output voltage reaches a certain voltage greater than the clamp's voltage, modeled as dissipation of power at resistor Ro 212. If the output voltage is less than the clamp's voltage (Do), then Ro 212 cannot conduct current to allow power dissipation and no ozone concentration is produced.

The output capacitance Co (modeled as capacitor 111 of FIG. 1A) can be given as Co=Cd0*Cd1/(Cd0+Cd1), where Cd0 is capacitor 211 in parallel with the series voltage clamp 213 and resistor 212, and Cd1 is capacitor 214 to ground.

Figure 2B:
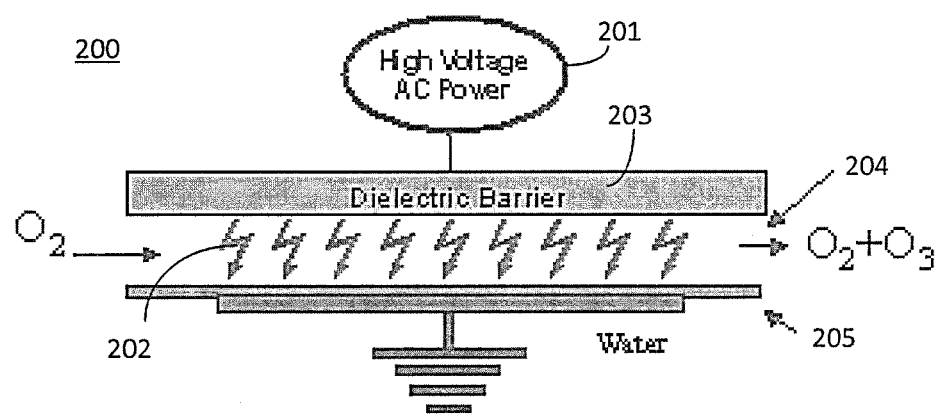
FIG. 2B is a representation of a dielectric barrier discharge cell for generating ozone for which a high voltage AC power signal can be supplied by a power system of an embodiment of the invention.

FIG. 2B provides a representation of one type of dielectric barrier discharger cell that may use the power stage configuration described herein to provide its high voltage AC power. As shown in FIG. 2B, the cell 200 can include a first electrode (not shown) that, upon application of AC power 201, generates an electrical discharge 202 from a first dielectric barrier film 203 across a gap 204 to a second electrode 205. An optional second dielectric barrier film (not shown) can be disposed on the second electrode 205. Water can be used to carry charge from the second electrode 205 to a ground. In a specific embodiment, the first dielectric barrier film 203 is formed of alumina oxide ($Al_2O_3$) and the second electrode 205 is formed of tungsten.

For ozone generation applications, oxygen ($O_2$) passing through the gap is broken down into atomic oxygen by the electric discharge across the gap, enabling the atomic oxygen to recombine into a mixture of ozone ($O_3$) and oxygen ($O_2$).

Figure 3:
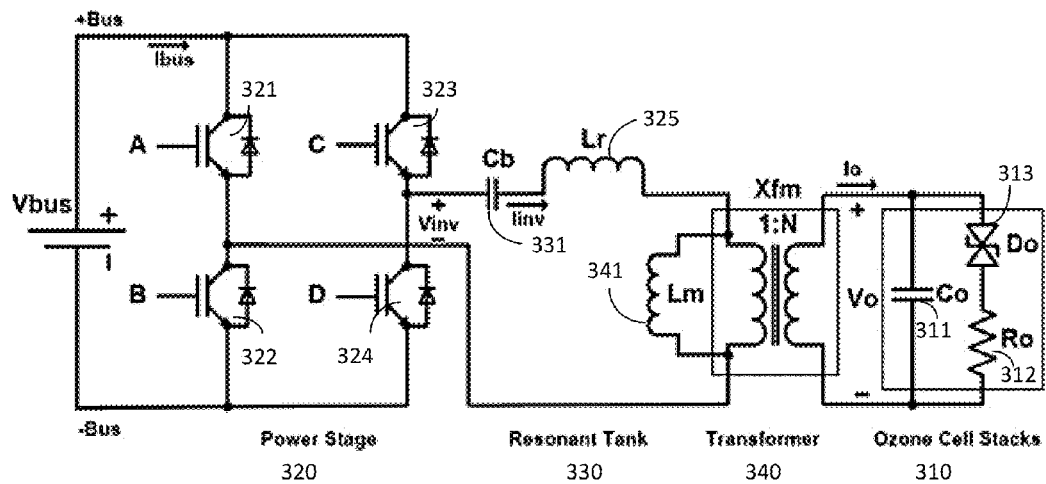
FIG. 3 is a schematic diagram of a single power train with resonant inverter power stage according to an embodiment of the invention.

FIG. 3 is a schematic diagram of a single power train with resonant inverter power stage according to an embodiment of the invention. The power train incorporates an electrical model of a dielectric barrier discharge cell that can be used to model an ozone generator in accordance with an embodiment of the invention. As shown in FIG. 3, the switches of the power stage inverter 320 are implemented using IGBTs (321, 322, 323, and 324) arranged in a full bridge and that convert an incoming DC bus voltage input (Vbus) into a sinusoidal waveform through a parallel resonant tank network (via resonant tank 330, transformer 340, and ozone cell stacks 310). Although IGBTs are illustrated and described with respect to the embodiment shown in FIG. 3, it should be understood that embodiments are not limited thereto and other suitable transistor types may be used.

The resonant tank 330 can include a blocking capacitor Cb 331 for protecting the full bridge IGBT of the power stage 320 and the high voltage transformer 340 from failure due to asymmetry in the driver circuit; a resonant inductor Lr 325 (which can include transformer leakage inductance); a high voltage step up transformer Xfm 340 (with magnetized inductance Lm 341); and an ozone load cell stack 310 (having capacitance Co 311, impedance Ro 312, and clamp voltage Do 313). With a 5 kW single power train, the transformer output voltage can step up to about 8 kV pk-pk at around 30 kHz of switching frequency (fsw) at a full output load operation. The resonant tank's frequency fres can be given by $$fres = \frac{1}{2*\pi*\sqrt{Lr*Co*N^2}},$$

where N is the transformer turn ratio. Where $Cb \gg Co*N^2$, $Lm \gg Lr$, and the quality factor Q is greater than 1 and defined as $$Q = \frac{Ro}{N^2\sqrt{[Lr/(Co*N^2)]}},$$

then the simplification shown in FIG. 1A is valid. In certain embodiments, to inhibit recirculation of the resonant tank's current (energy loss), Q is selected to be less than 3. It should be understood that the components of the model are idealized (for the first order) while neglecting the high order harmonic (for the fundamental harmonic) to simplify the analysis.

Although not shown in the figures, additional circuits may be included in the dielectric barrier discharge power system for purposes including, but not limited to, optimizing or improving component performance. For example, within the power stage resonant tank's circuits, there may be variations in the components' tolerances, which can affect the fres in a manner degrading the performance of the power stage. Accordingly, in some embodiments, a tuning circuit can be included that operates by tracing along the inverter output resonant tank's curve starting from a slightly higher frequency (~40 kHz) than the resonant frequency fres. The tracing halts when the desired input power is reached. This type of circuit can be referred to as a peak power point search circuit. The circuit is used to make sure that an individual inverter of the power stage produces the maximum output power. An exemplary embodiment of such a circuit is described in U.S. Patent Application Publication No. 2007/0108040, which is hereby incorporated by reference in its entirety. This auto self-tuning design offers several advantages in coping with the inverter power stage's component tolerance; switching frequency variation; temperature variations; and ozone cell stack aging.

Figure 1B:
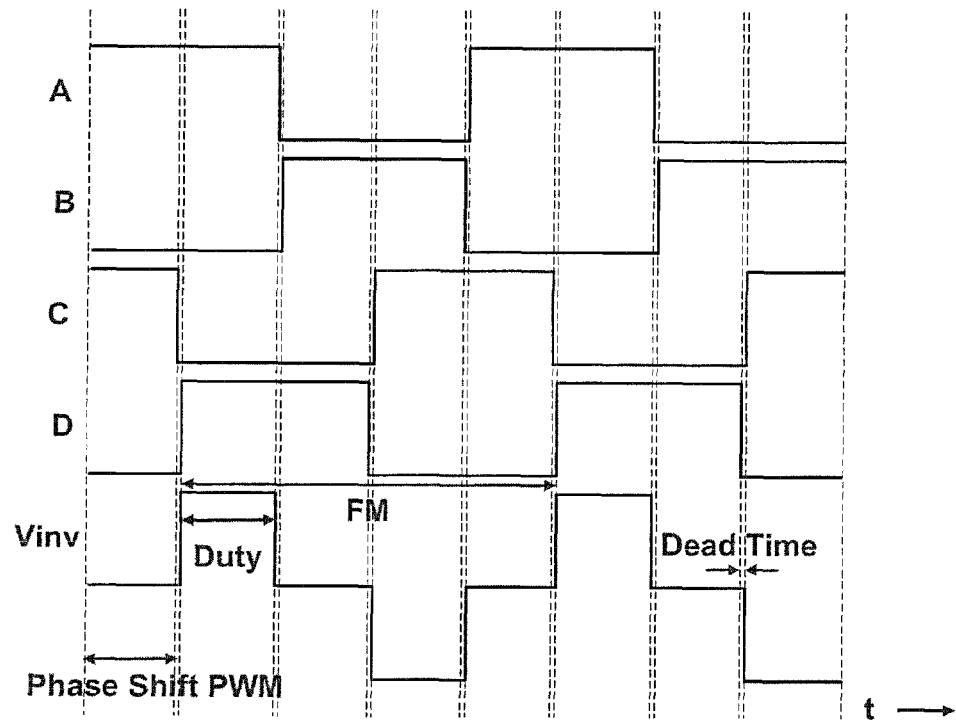
FIG. 1B shows a set of plots of a soft switching scheme and resulting output of a power stage in accordance with an embodiment of the invention.

Referring again to FIG. 1A, control signal A drives the first switch 121, control signal B drives the second switch 122, control signal C drives the third switch 123, and control signal D drives the fourth switch 124. In operation, control signals A and D are used to respectively turn ON the first switch 121 and the fourth switch 124 for the lower rail of the sinusoidal waveform and control signals B and C are used to respectively turn ON the second switch 122 and the third switch 123 for the higher rail of the sinusoidal waveform. A simplified timing diagram is shown in FIG. 1B, which illustrates a zero voltage switch (ZVS) switching scheme and the resulting output response, in accordance with an embodiment of the invention. A ZVS switching scheme is a soft switching technique. Soft switching techniques use resonant techniques to switch ON at zero voltage and to switch OFF at zero current. Negligible switching losses may occur in the devices.

As shown in FIG. 1B, by incorporating phase shifting in the control signals, it is possible to minimize ringing in the output voltage caused by all switches being OFF. The amount phase shift used for the A and D control signals and the B and C control signals is a function of the system and can be any suitable phase shift for inhibiting ringing in the particular system in which the subject power stage is used.

In accordance with various embodiments of the invention, the power stage control signals A, B, C, and D are generated for phase shift ZVS through a combined pulse width modulation (PWM) and frequency modulation (FM) control scheme.

Figure 4:
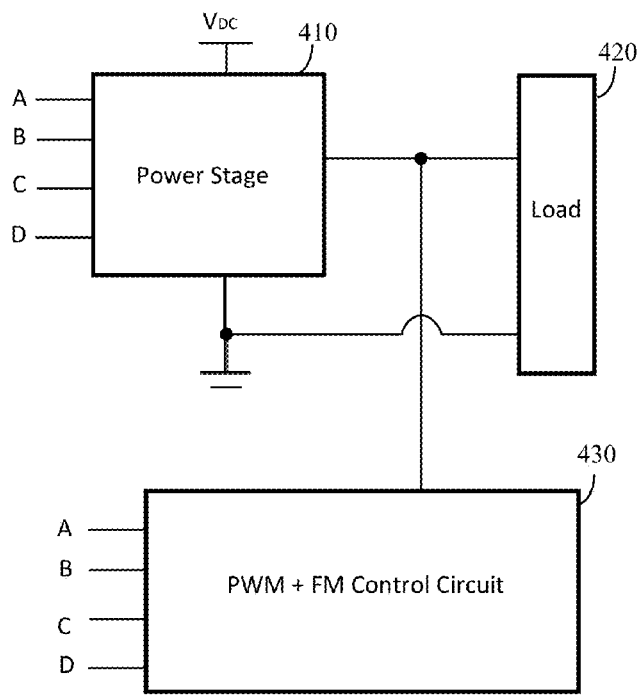
FIG. 4 is a block diagram of a dielectric barrier discharger power system according to an embodiment of the invention.

FIG. 4 shows a block diagram of a dielectric barrier discharger system according to an embodiment of the invention. Referring to FIG. 4, a power stage 410 converts a DC bus voltage $V_{AC}$ to an AC signal in order to supply a high voltage AC power to the load 420. In certain embodiments, the configuration of the power stage 410 and load 420 are arranged as shown in FIG. 1A and/or FIG. 3. The power stage control signals A, B, C, and D are generated and controlled by the control circuit 430 that forms part of a feedback loop. The control circuit 430 can include a phase shift ZVS PWM combined with FM control. In certain embodiments, the signal generator for the power stage control signals is a phase-modulating and variable-frequency capable PWM chip. Of course, in some embodiments, any circuit or chip that enables control of phase, duty cycle, and frequency may be used, where at least the duty cycle and frequency of the output signals can be adjusted by one or more inputs to the circuit or chip. The pulse width of the control signals A, B, C, and D is controlled by a PWM feedback control scheme of the control circuit 430 and the frequency of the control signals A, B, C, and D is controlled by a FM feedback control scheme of the control circuit 430. In accordance with certain embodiments of the invention, the PWM and FM feedback control scheme is implemented as a current loop control scheme, where an output current is sensed at an output of the power stage and used in controlling the pulse width and frequency of the signals provided back to the power stage.

According to one embodiment, the integration of FM with the PWM control counteracts the light load hard switching of a solely PWM-based control scheme. Hard switching occurs because the inverter output voltage's pulse width greatly decreases at light loads. This then causes the resonant inductor's current to greatly decrease as well. Therefore, without sufficient stored energy in the resonant inductor, the semiconductor power devices can no longer sustain the soft switching.

In hard switching, energy stored in the junction capacitance discharges into the transistor at each turn-on. Therefore, hard switching can cause power loss, voltage/current spikes, and electromagnetic interference (EMI) problems. The combined PWM and FM control schemes along with the soft switching topology described herein reduces the need for additional cooling systems. For example, as mentioned above, when only PWM is used to control the switching signal, hard switching may occur at light loads. In contrast, the combined PWM and FM control scheme of embodiments of the invention enable soft switching through all loads (full and light).

A "light load" condition depends on the particular system and is generally understood to be about 5% of full load. In practice, the particular percentage for light load is a percentage where ozone is still able to be generated. As illustrated by the examples in this disclosure, embodiments of the invention can operate at less than 5% of full load and function even when ozone is not being generated.

In operation, the subject combined PWM and FM control scheme increases the frequency at light loads causing the previously decreasing pulse width to be negligible. During operation, the PWM and FM control scheme run in parallel, but the weight given to the PWM and the FM varies under changing load conditions. This results in an improved dynamic range performance.

For example, at normal operation (including full load), the duty cycle is used to control the ozone output power; whereas for lighter loads, the power is further reduced by increasing the switching frequency. In addition, because the power system power stage is configured, in certain embodiments, to soft-switch (e.g., by zero voltage switching) down to zero percent of maximum output power, reliability of the power system can be improved.

Figure 5A:
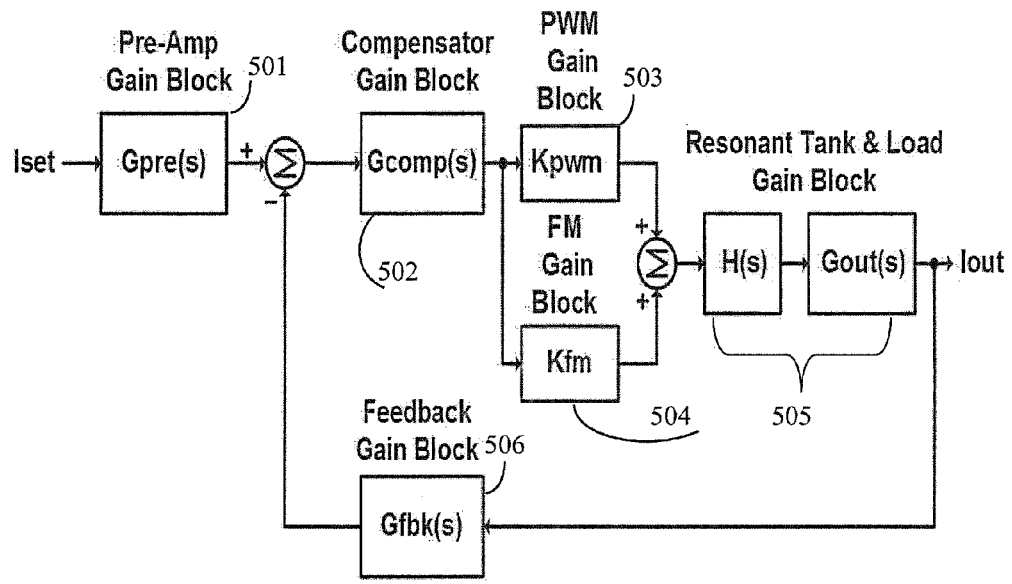
FIGS. 5A and 5B show basic block diagrams of a PWM and FM current loop control scheme (FIG. 5A) and system level control scheme with power loop (FIG. 5B) according to a first embodiment of the invention.

FIG. 5A shows a block diagram of a current loop control scheme according to one embodiment. The diagram provides transfer function blocks of each individual gain for the complete current loop control scheme. The function blocks include a Pre-Amp Gain Block 501, a current loop Compensation Gain Block 502, a PWM Gain Block 503, a FM Gain Block 504, a Resonant Tank & Load Gain Block 505, and a Feedback Gain Block 506.

According to one embodiment, the equation of each individual gain block in the current loop can be expressed as follows:

"Pre-Amp gain Block:"

$Gpre(s) = Gpre_{DC} * 1/(s/2*\pi*fp\alpha+1)$

Current Loop "Compensator Gain Block:"

$Gcomp(s) = Gcomp_{DC} * (s+2*\pi*fz)/[s*(s/2*\pi*fp\beta+1)]$.

"Resonant Tank and Load Gain Block:"

$H(s)*Gout(s) = Gpwr(s)$.

For example, $Gpwr(s) = \omega_0^2/[s^2+(1/Q)*\omega_0*s+\omega_0^2]$, where $w_0 = 1/\sqrt{(Lr*Co*N^2)}$.

Current "Feedback Gain Block:"

$Gfbk(s) = Gfbk_{DC} * 1/(s/2*\pi*fp\lambda+1)$.

For the PWM Gain Block and FM Gain Block, Kpwm≠Kfm=constant.

Referring to FIG. 5A, a current set point (Iset) is given a certain value. In certain embodiments, this can be accomplished using a processor (see description below with respect to FIG. 5B). In addition, the actual current (Iout) output from the inverter power stage (see 410 of FIG. 4, and as shown in FIG. 5A includes the Resonant Tank & Load Gain Block 505) can be measured by a current sensor and input to the feedback loop through Feedback Gain Block 506. The Iset (that may be amplified via a pre-amp stage with corresponding Pre-Amp Gain Block 501) and the current (Ifbk) output from the Feedback Gain Block 506 are added at a current loop compensator with representative Gain Block 502. The output of this gain stage is then used by a phase shift PWM and FM Controller circuit or chip (having corresponding PWM Gain Block 503 and FM Gain Block 504) to produce a switching frequency (Fsw) for gate drivers (see FIGS. 6A and 6B) of the power stage. The feedback loop performs in a manner to maintain the output current at a level equal to the Iset value.

In the case of light loads, the output from the current loop Compensator Gain Block 503 is used to change the frequency time constant of the clock of the PWM chip, which allows frequency modulation to occur because the Fsw is inversely proportional to the time constant. Therefore, as the power on the line drops, the frequency modulation control lowers the frequency, enabling the power to be maintained at the appropriate levels.

Figure 5B:
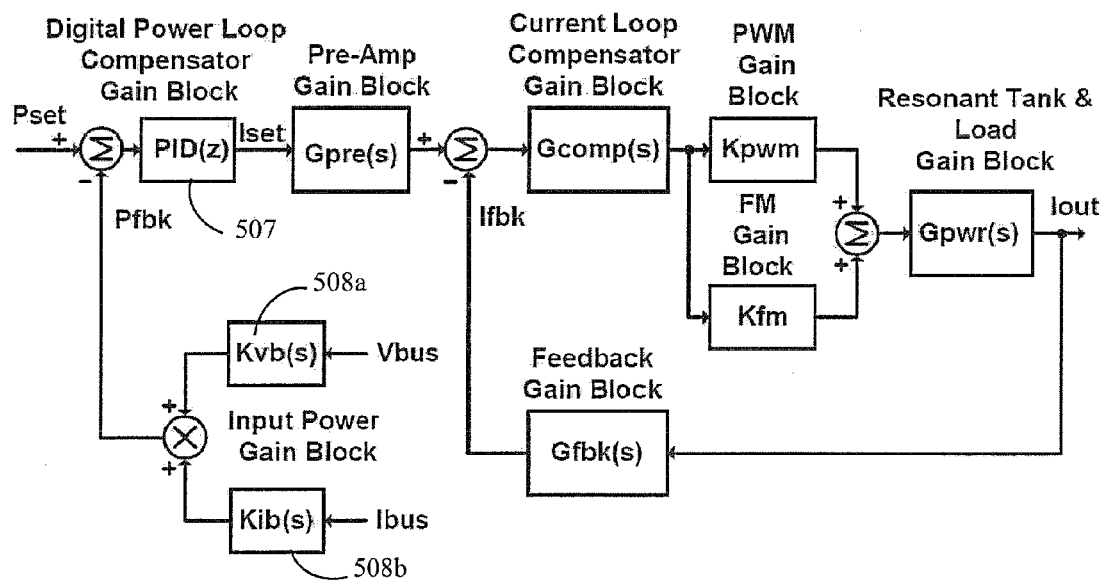

The current loop diagram shown in FIG. 5A illustrates an analog control scheme. In another embodiment, such as shown in FIG. 5B, a digital control scheme can be utilized in place of or in addition to the analog control scheme shown in FIG. 5A. FIG. 5B provides a system level diagram with power loop and inner current loop of a control scheme for a ZVS resonant inverter. The current loop portion functions similarly to that described with respect to FIG. 5A. According to one embodiment, the power loop uses a digital control scheme; and the power loop is implemented using a processor. The processor can be, but is not limited to, a low cost microprocessor (µP) or a Digital Signal Processor (DSP). Memory can be included as part of the processor or as a separate component. In operation, the processor issues a power set point (Pset). In addition, the actual input power is measured using the DC bus voltage ($V_{DC}$ of FIG. 4 or Vbus shown in FIGS. 1 and 3) and the DC bus current (see Ibus in FIGS. 1 and 3), scaled with the gain from the two DC input sources (as Kvb(s) 508a and Kib(s) 508b) and multiplied together for the input Power Gain Block. The product of the scaled and multiplied DC input sources results in the power feedback signal (Pfbk). The power set point Pset and the power feedback Pfbk are added together to feed a digital power loop compensator (PID). The output of the PID is the current set point Iset as described with respect to FIG. 5A.

As with FIG. 5A, the diagram shown in FIG. 5B provides transfer function blocks of each individual gain for the complete power loop (with inner current loop) control scheme. According to one embodiment, the equation of each individual gain block in the current loop can be expressed as provided with respect to FIG. 5A and the equation of each individual gain block for the power loop can be expressed as follows:

"Digital Power Loop Compensator Gain Block:"

$$PID(z) = Kp + Ki/(1-z^{-1}) + Kd*(1-z^{-1}),$$

Where $z = e^{s/Fclk}$; Fclk=µP_Clock (frequency of the clock from the processor). For the Input Power Gain Block, the power feedback bus voltage "Vbus" gain block can be expressed as:

$$Kvb(s) = Kvb_{DC} * 1/(s/2*\pi*fp\phi+1),$$

and the power feedback bus current "Ibus" gain block can be expressed as:

$$Kib(s) = Kib_{Dc} * 1/(s/2*\pi*fp\phi+1).$$

It should be understood that the components of the models are idealized (for the first order) while neglecting the high order harmonic (for the fundamental harmonic) to simplify the analysis.

In another embodiment, instead of controlling input power (and using the power loop illustrated in FIG. 5B, output load power control may be used. For example, the output ozone voltage and the inverter current sensed at the output of the inverter stage can be used as part of the control loop. Because the ozone cell behaves as a complex impedance and both the current and voltage are moderately high frequency, bandwidth, slew rate, sampling time, and other factors are needed in order to find the product of the current and the voltage in real time.

In yet another embodiment, the power loop shown in FIG. 5B can be closed based on the ozone concentration. For example, the ozone concentration from the ozone cells can be measured with a concentration transducer, the output of which can be used to close the power loop.

Figure 6A:
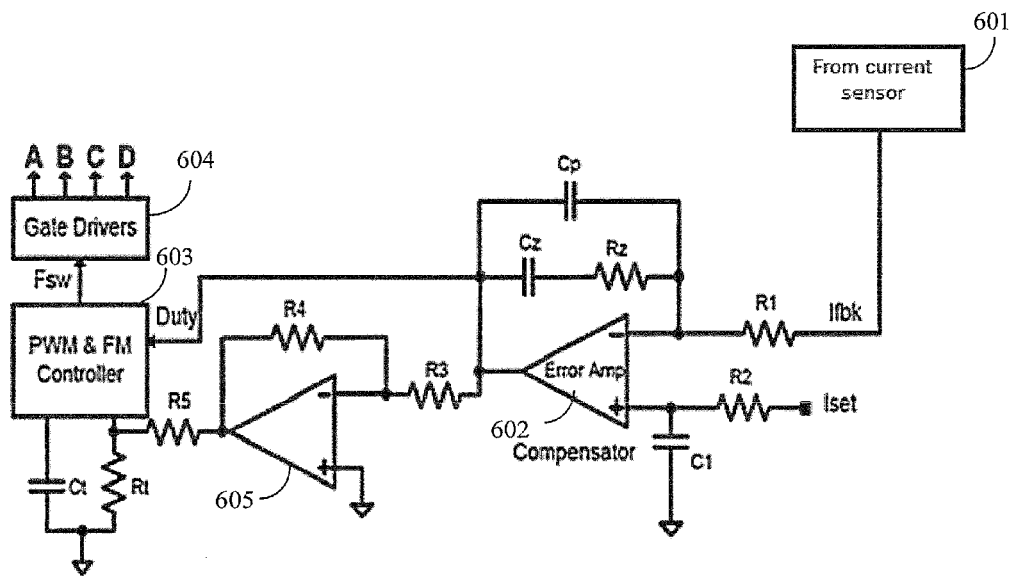
FIGS. 6A and 6B show schematic diagrams of the PWM and FM current loop control scheme shown in FIG. 5A according to certain embodiments of the invention.
Figure 6B:
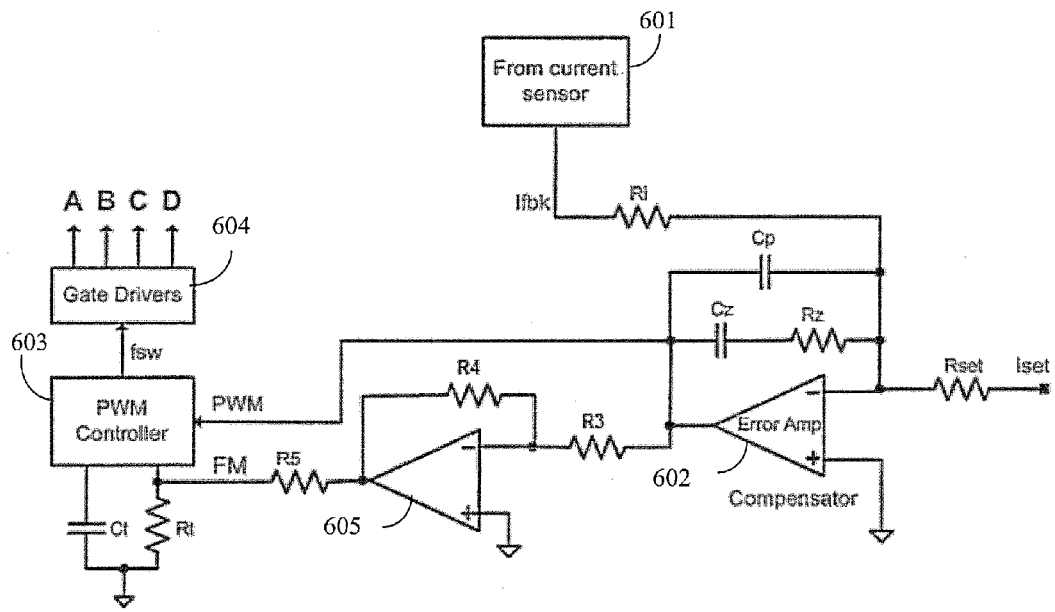

FIGS. 6A and 6B illustrate two example current loop circuit implementations following the control scheme described with respect to FIG. 5A. As shown in FIGS. 6A and 6B, the current at the output of the inverter stage is measured by a current sensor 601 and fed (as Ifbk) to a current loop error amp compensator 602 along with Iset. In one embodiment, as shown in FIG. 6A, Iset is provided as an input to a positive input terminal of the current loop error amp compensator 602 and Ifbk is provided as an input to a negative input terminal of the current loop error amp compensator 602. In another embodiment, as shown in FIG. 6B, Iset and Ifbk are summed such that both are provided to the negative input terminal of the current loop error amp compensator 602. The output of the error amp compensator 602 provides the duty cycle command for the phase shift PWM controller 603 and also enables the PWM controller 603 to produce a switching frequency Fsw for the Gate Drivers 604. The switching frequency can be frequency modulated via an inverting amplifier 605 that receives the output of the error amp compensator 602 and outputs a signal to the PWM controller 603. The output of the inverting amplifier 605 changes the PWM clock's frequency time constant, allowing frequency modulation to occur.

The Gate Drivers 604 produce the control signals A, B, C, and D for the full bridge inverter stage such as described with respect to FIGS. 1A-1B (switches 121, 122, 123, 124) and FIG. 3 (switches 321, 322, 323, 324 of power stage 320).

The capacitor Ct and the resistor Rt connected to the PWM controller 603 provide the initial fixed frequency that is adjusted by the current compensation signal from the inverting amplifier 605. The op-amp, in the inverting amplifier configuration as shown in FIGS. 6A and 6B, can be used to adjust the signal used to control the frequency modulation with a multiple (or fraction) of the signal used to control the duty cycle (pulse width). In a further embodiment, the gain of the amplifier for the FM control can be varied by using a variable gain amplifier. The gain may be controlled using a gain control signal sent by the processor. In one embodiment, preset modifications stored in a memory associated with the processor may be used when certain conditions in the system are met. In another embodiment, a user interface may be included to enable user control of the gain adjustment. The user interface may be connected to and communicate with the processor. Alternatively, or in addition, the user interface may include a manual adjustment of resistance via a potentiometer (that may adjust, for example, R4 of FIG. 6A or R4 of FIG. 6B).

Figure 7:
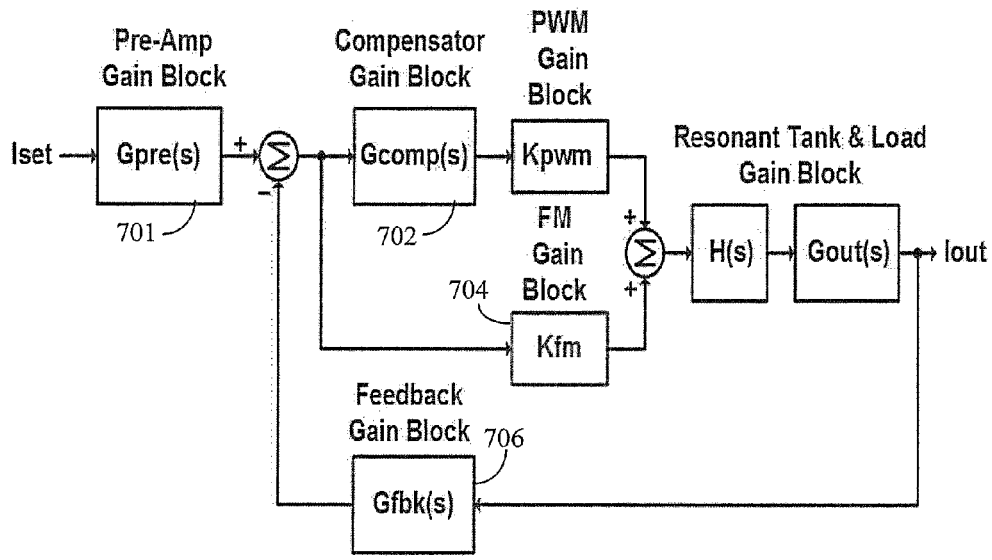
FIG. 7 shows a basic block diagram of a PWM and FM current loop control scheme according to a second embodiment of the invention.
Figure 8:
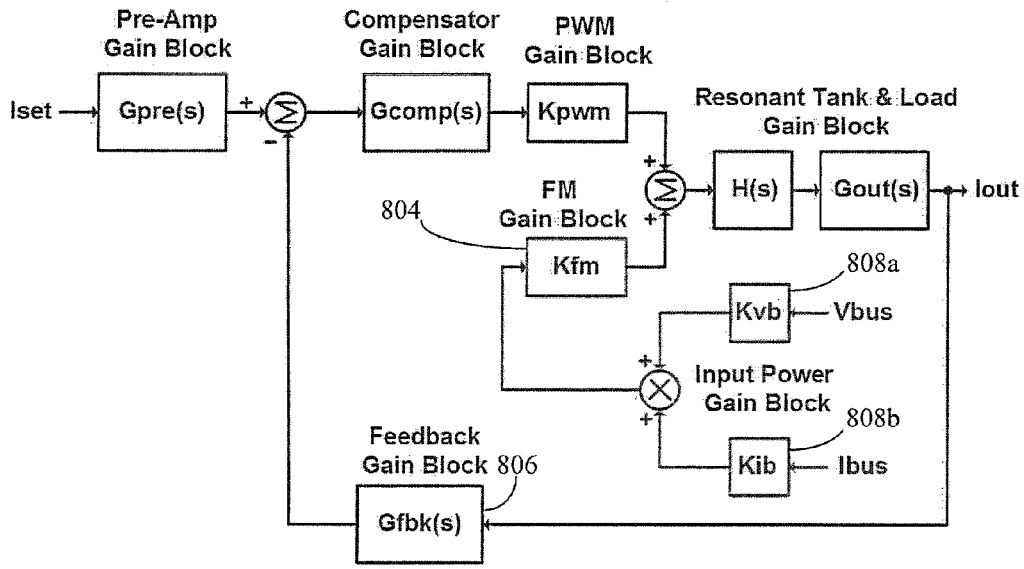
FIG. 8 shows a basic block diagram of a PWM and FM current loop control scheme according to a third embodiment of the invention.
Figure 9:
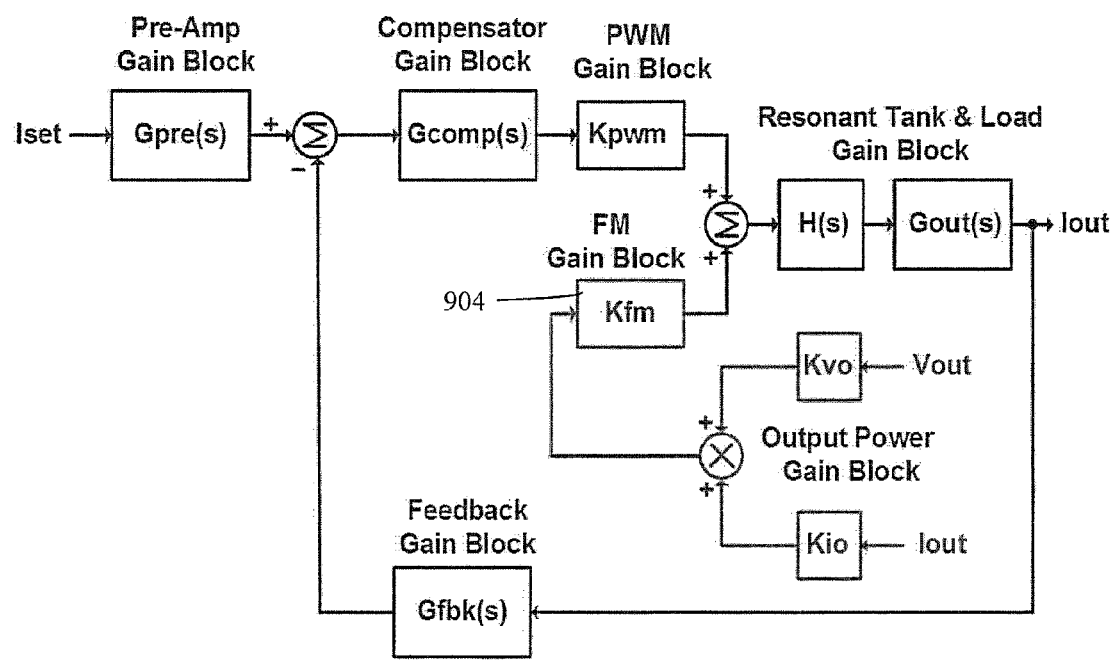
FIG. 9 shows a basic block diagram of a PWM and FM current loop control scheme according to a fourth embodiment of the invention.

FIGS. 7-9 illustrate current loop configurations in accordance with some embodiments of the invention. For example, referring to FIG. 7, a current loop control scheme according to a second embodiment is similar to the scheme shown in FIG. 5A. However, instead of the output of the Compensator Gain Block 702 stage being used by both the phase shift PWM and FM Controller to produce a switching frequency (Fsw) for the Gate Drivers (see 604 of FIGS. 6A and 6B) of the power stage, the FM Gain Block 704 stage accepts the Iset (that may be amplified via a pre-amp stage with corresponding Pre-Amp Gain Block 701) and the current (Ifbk) output from the Feedback Gain Block 706 in parallel with the current loop compensator.

For the embodiment shown in FIG. 8, the FM Gain Block 804 stage uses the input power for controlling the frequency instead of the Iset current and the feedback current from the Feedback Gain Block 806 as described with respect to FIG. 5A or FIG. 7. For example, the DC bus voltage ($V_{AC}$ of FIG. 4 or Vbus shown in FIGS. 1 and 3) and the DC bus current (see Ibus in FIGS. 1 and 3) are scaled with the gain from the two DC input sources (as Kvb(s) 808a and Kib(s) 808b) and multiplied together before inputted through the FM Gain Block 804.

For the embodiment shown in FIG. 9, the FM Gain Block 904 stage uses the output power for controlling the frequency instead of the input power as described with respect to FIG. 8.

In certain embodiments, the power loop portion described with respect to FIG. 5B can be configured with one of the current loops shown in FIGS. 7-9.

Advantageously, in certain embodiments, standards for accommodating power line variation while still maintaining power can be met without requiring extra circuitry or protective capacitors, which take up space and may require additional cooling techniques. In particular, by using frequency modulation control, variation due to loads on the power line results in variation of the frequency driving the switches and the ability to maintain power on the line. One example of a standard that can be met by the subject combined PWM and FM control scheme is the SEMI F47 standard "Specification for Semiconductor Processing Equipment Voltage Sag Immunity," which defines the voltage sag ride-through capability (or threshold) that a tool used in semiconductor processing, metrology, and automated test equipment must operate through without interruption.

Embodiments of the subject power system and power control technique can be implemented without increasing the size of previous systems. In various embodiments, the power system can fit into tighter spaces than traditional non-resident power converters while providing equal to or greater output power and control.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

The PSpice® circuit simulator tool, a registered trademark of Cadence Design Systems, Inc., was used to simulate a dielectric barrier discharger designed in accordance with an embodiment of the invention.

Figure 10:
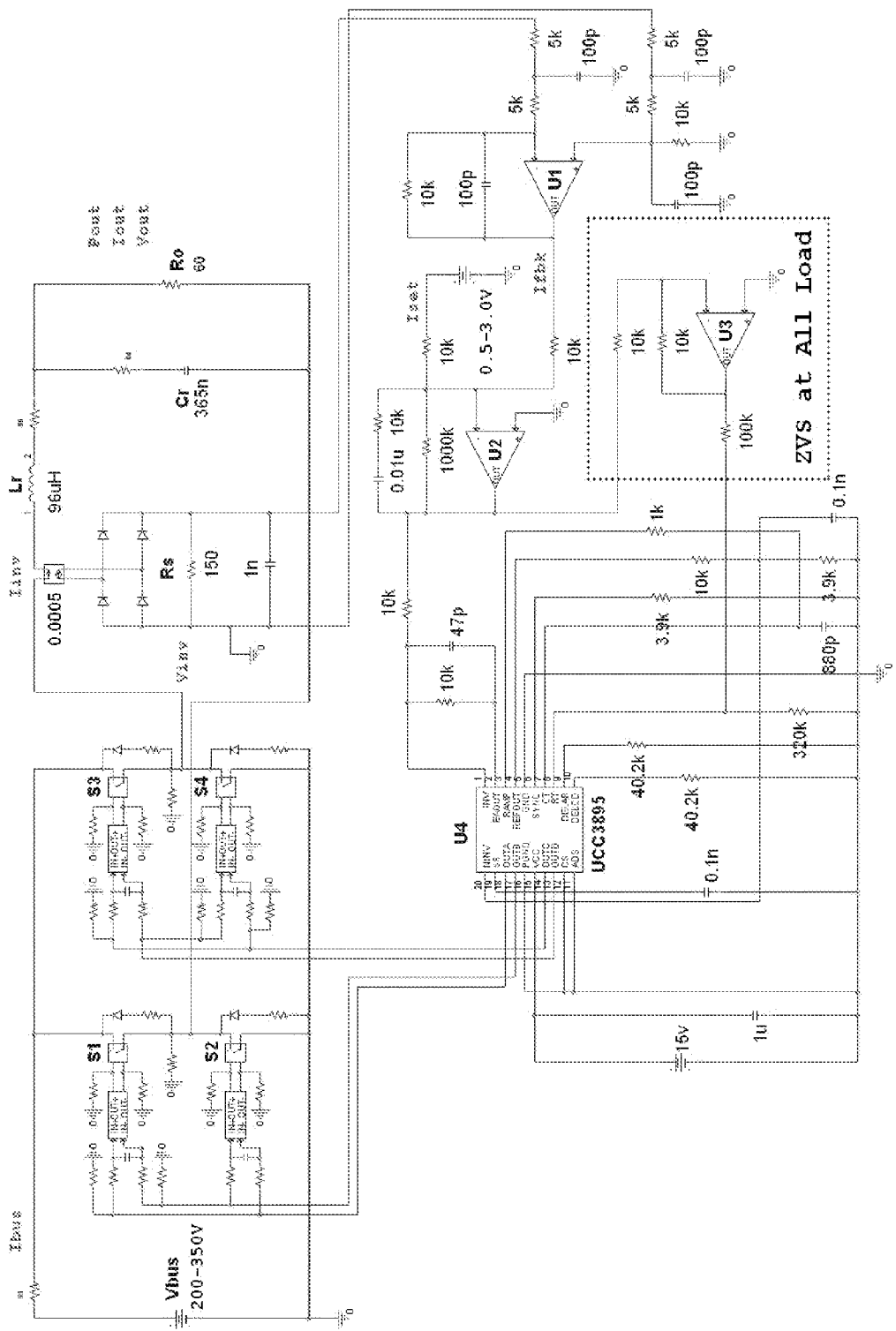
FIG. 10 is a simulation schematic of a ZVS resonant inverter current loop with PWM and FM control according to an embodiment of the invention.

In the examples, the PSpice® simulations for a dual 10 kW ozone power train (5 kW per power train) are compared to experimental results to illustrate the functionality of the subject systems and methods. FIG. 10 shows the PSpice® schematic used for the PSpice® simulations of a versatile ZVS Resonant Inverter current loop design in accordance with one embodiment of the invention. The schematic follows a similar implementation as that shown in FIG. 6B where the feedback current and the current set point Iset are summed before being input to the compensator. In addition, the current is measured using differential amplifiers to avoid common mode noise. The resonant tank and ozone cell(s) are simulated using the inductor (105), capacitor (111), and resistor (112) configuration described with respect to FIG. 1A.

For the simulations, the input Vbus voltage was varied from low line to high line (200-350 VDC), and the Iset was varied by using a voltage source at 0.5-3.0 VDC (0.5% to 110% load). These two conditions cover the expected operating ranges.

EXAMPLE 1

Light Load

Figure 11A:
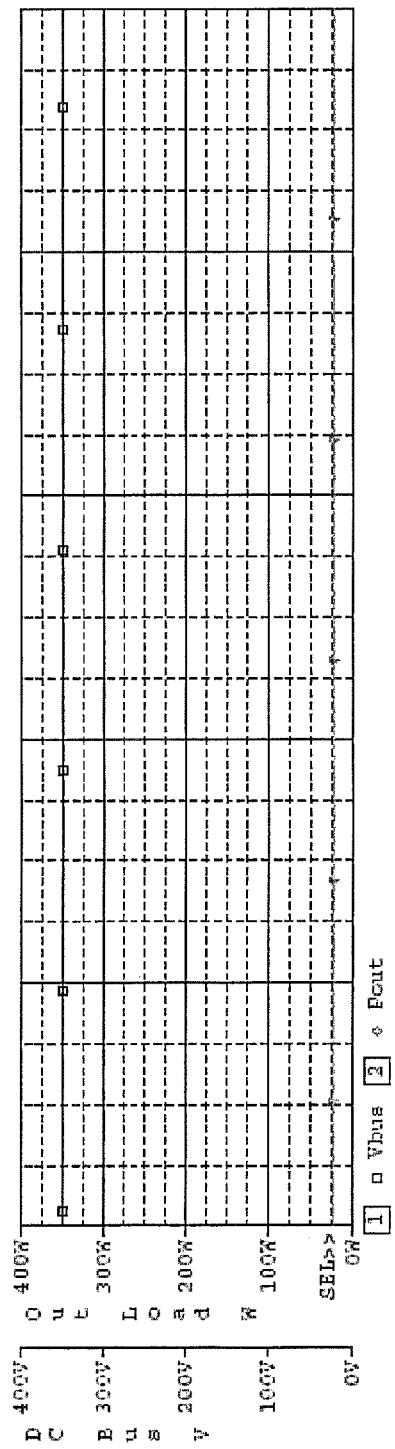
FIGS. 11A-11D show simulation plots and a scope waveform of an embodiment of the subject ZVS resonant inverter at light load conditions.
Figure 11B:
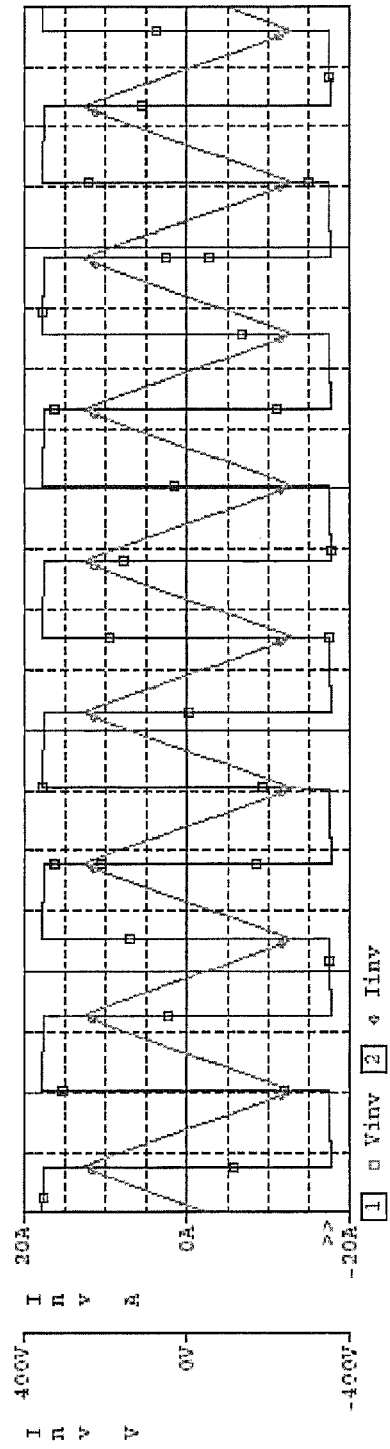
Figure 11C:
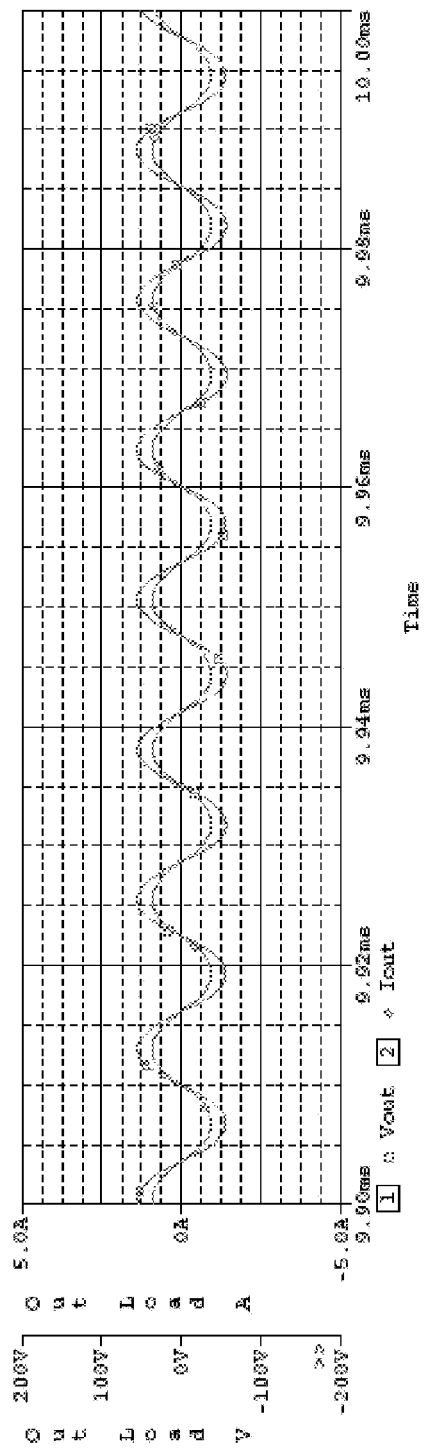
Figure 11D:
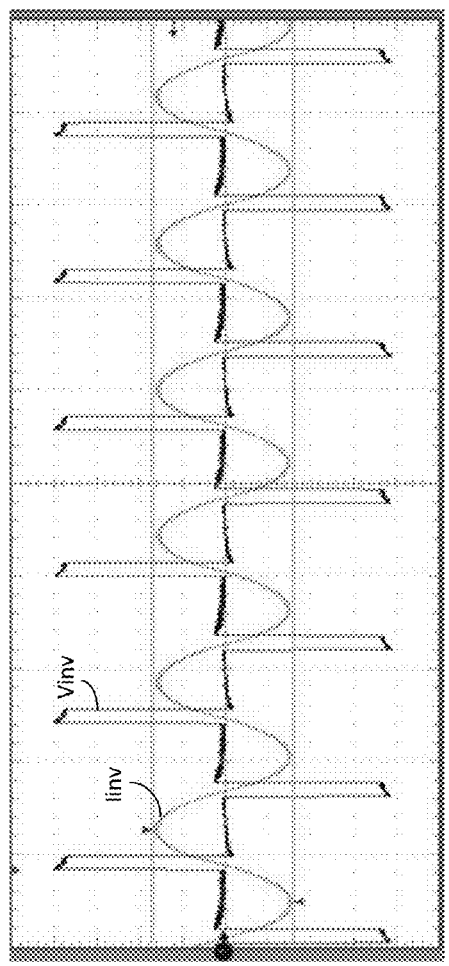

The simulation results for the current loop at light load are shown in FIGS. 11A-11C and the experimental results for the current loop at light load is shown in FIG. 11D. FIG. 11A shows that Vbus was set at 350 V, and the light load conditions show output load power being less than 25 W (compare to ~250 W output power light load condition of 5% ozone concentration of a 5 kW system's maximum output). FIG. 11B shows a plot of the inverter stage output voltage (Vinv) and current (Iinv). FIG. 11C shows a plot of the power stage output voltage (Vout) and current (Iout) (i.e., the voltage and current being supplied to the ozone cell(s)). FIG. 11D shows the scope waveforms of the inverter stage output voltage Vinv and current Iinv for the experimental system where Vbus=300 V, Ibus=0.8 A, Pin=240 W. As illustrated by FIG. 11C and confirmed by the waveforms shown in FIG. 11D, the combination of PWM and FM control enable soft switching even at light loads. It should be noted that the scale for the plots for the simulation and the measurement result waveforms is not uniform because the simulation waveform was at 0.5% Iset while the experimental was at ~5% of Iset due to the process limitations for producing ozone.

EXAMPLE 2

Full Load

Figure 12A:
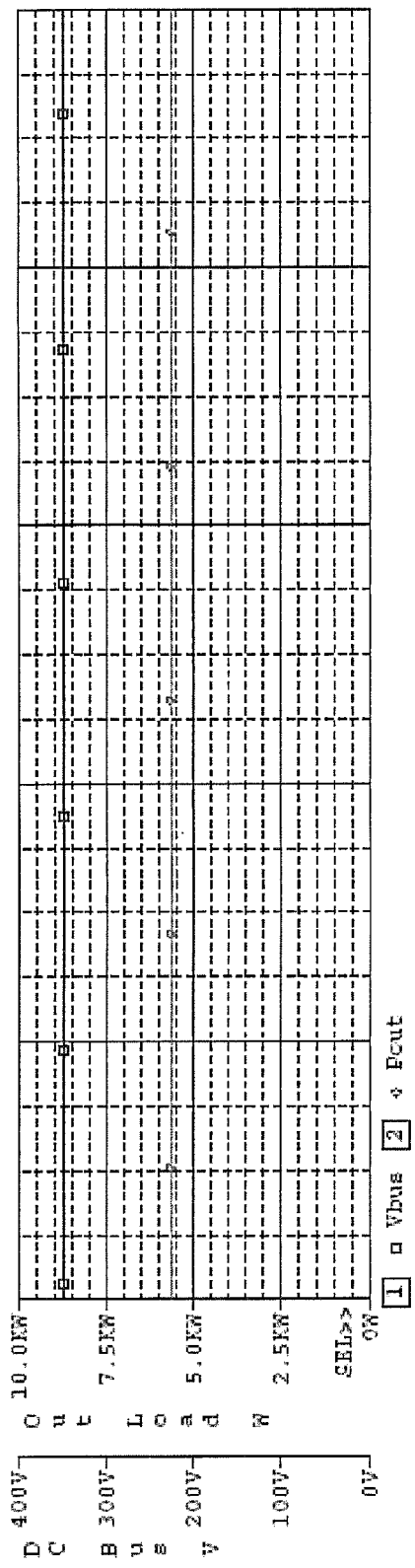
FIGS. 12A-12D show simulation plots and a scope waveform of an embodiment of the subject ZVS resonant inverter at full load conditions.
Figure 12B:
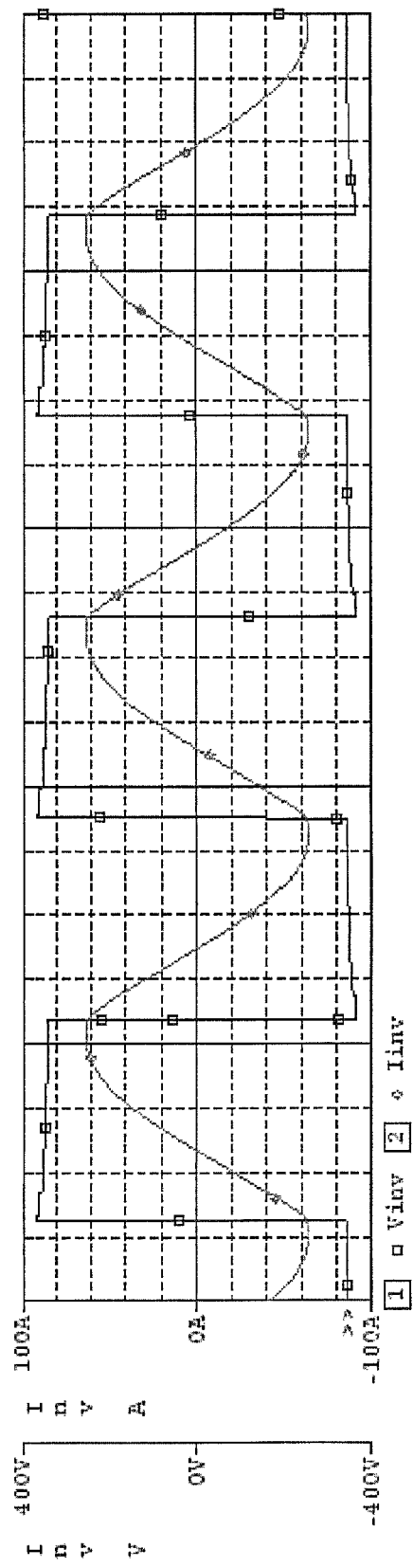
Figure 12C:
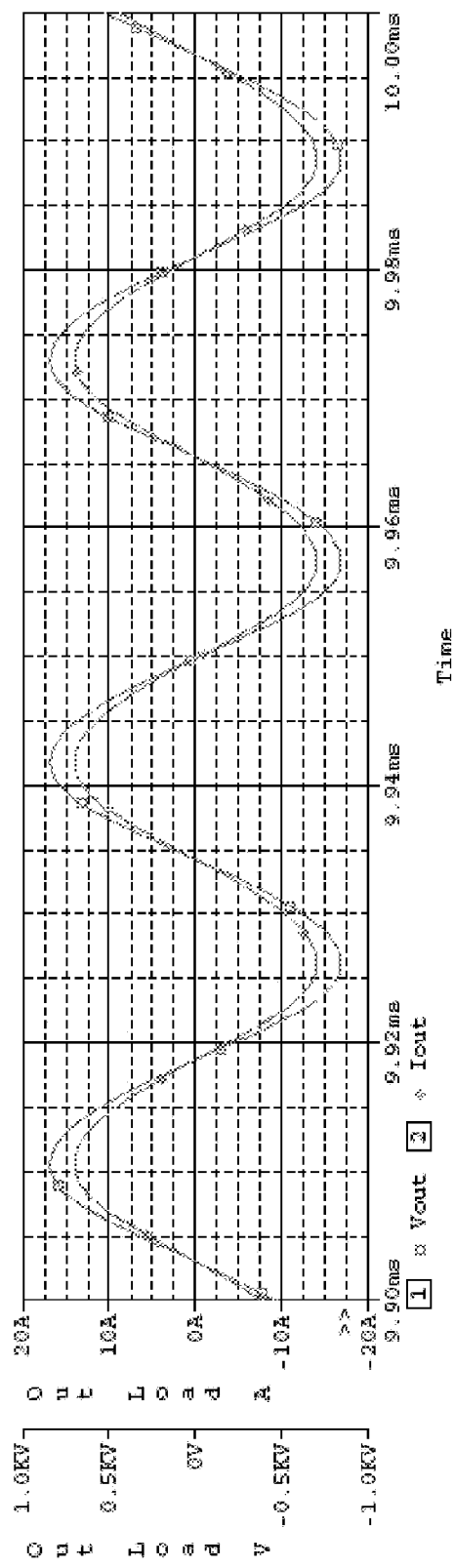
Figure 12D:
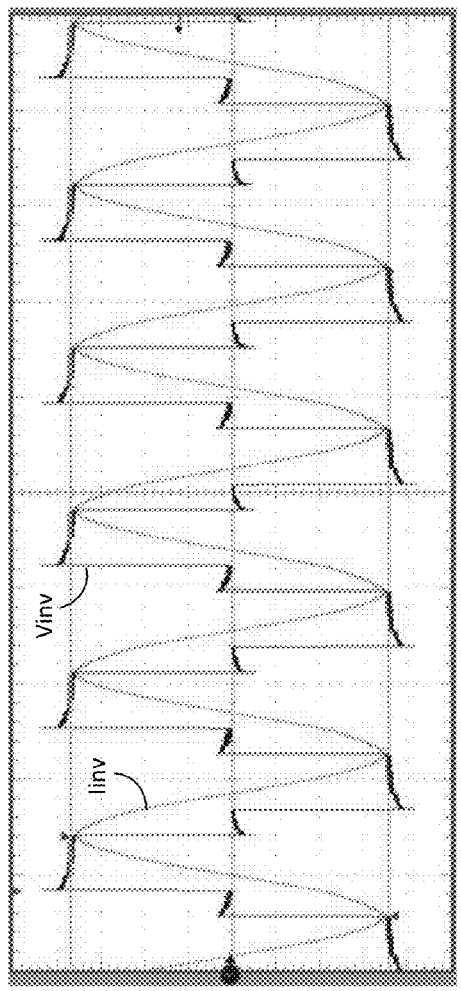

The simulation results for the current loop at full load are shown in FIGS. 12A-12C and the experimental results for the current loop at 110% of full load is shown in FIG. 12D. FIG. 12A shows that Vbus was set at 350 V, and the full load conditions show output load power being at about 5.5 kW (single stage). FIG. 12B shows a plot of the inverter stage output voltage (Vinv) and current (Iinv). FIG. 12C shows a plot of the power stage output voltage (Vout) and current (Iout) (i.e., the voltage and current being supplied to the ozone cell(s)). FIG. 12D shows the scope waveforms of the inverter stage output voltage Vinv and current Iinv for the experimental system where Vbus=300 V, Ibus=18.3 A, Pin=~5.5 kW. As illustrated by FIG. 12C and confirmed by the waveforms shown in FIG. 12D, the combination of PWM and FM control enable soft switching and increased output power.

Any reference in this specification to "one embodiment," "an embodiment," "exemplary embodiment," "second embodiment," etc., means that a particular feature, structure, or characteristic described in connection with the referenced embodiment is included in at least one embodiment of the invention. The appearances of such phrases in various places in the specification are not necessarily all referring to the same embodiment. In addition, any elements or limitations of any invention or embodiment of the invention disclosed herein can be combined with any and/or all other elements or limitations (individually or in any combination) or any other invention or embodiment of the invention disclosed herein, and all such combinations are contemplated within the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A dielectric barrier discharge power system comprising:
an inverter stage;
a resonant tank receiving an output of the inverter stage and outputting a signal for powering at least one dielectric barrier discharge cell; and
a control circuit comprising:
a gate driver providing switching signals to the inverter stage, the switching signals including a phase shift for soft switching; and
a pulse width modulation (PWM) controller for generating a switching frequency for the gate driver, the PWM controller having a first input configured to receive a first signal for adjusting a duty cycle of the switching frequency to perform PWM and a second input configured to receive a second signal for adjusting a clock frequency time constant of the PWM controller to perform frequency modulation (FM);
wherein the control circuit receives a feedback signal from the dielectric barrier discharge system and uses the feedback signal to generate the first signal and the second signal according to a load or line value of the dielectric barrier discharge system.

2. The dielectric barrier discharge power system according to claim 1, wherein the inverter stage comprises four transistors arranged as a full bridge.

3. The dielectric barrier discharge power system according to claim 2, wherein the four transistors are insulated gate bipolar transistors (IGBTs).

4. The dielectric barrier discharge power system according to claim 1, further comprising a transformer stepping up the signal from the resonant tank for powering the at least one dielectric barrier discharge cell.

5. The dielectric barrier discharge power system according to claim 1, wherein the switching frequency is in a range of 20 kHz to 40 kHz.

6. The dielectric barrier discharge power system according to claim 1, wherein the switching frequency is configured to be higher than a resonant frequency of the resonant tank.

7. The dielectric barrier discharge power system according to claim 1, wherein the feedback signal comprises a measured current signal received from a current sensor at the output of the inverter stage.

8. The dielectric barrier discharge power system according to claim 7, wherein during all load conditions, the measured current signal is compared to a current set point value and an error value of the comparison causes the first signal to adjust the duty cycle of the switching frequency to perform the PWM until the measured current reaches the current set point value, the error value of the comparison further causing the second signal to adjust the clock frequency time constant to change to perform the FM; and
the control circuit is configured such that an amount of weight given to the PWM and the FM for controlling power changes as the dielectric barrier discharge power system operates from a full load condition to a light load condition.

9. The dielectric barrier discharge power system according to claim 7, wherein the control circuit comprises a current control loop for generating the first signal and the second signal, the current control loop using the measured current signal sensed at the output of the inverter stage and a current set point.

10. The dielectric barrier discharge power system according to claim 9, wherein the current control loop comprises:
an error amplifier compensator receiving the measured current signal and the current set point and outputting the first signal; and
an inverting amplifier receiving the first signal and outputting the second signal.

11. The dielectric barrier discharge power system according to claim 9, wherein the current control loop comprises:
an error amplifier compensator receiving the measured current signal and the current set point and outputting the first signal; and
an inverting amplifier receiving an added signal of the measured current signal and a current set point and outputting the second signal.

12. The dielectric barrier discharge power system according to claim 9, wherein the feedback signal further comprises an input power signal, the input power signal being a product of a measured DC bus voltage supplied to the inverter stage and a measured DC bus current supplied to the inverter stage;
wherein the current control loop comprises:
an error amplifier compensator receiving the measured current and the current set point and outputting the first signal; and
an inverting amplifier receiving the input power signal and outputting the second signal.

13. The dielectric barrier discharge power system according to claim 9, wherein the feedback signal further comprises an output power signal, the output power signal being a product of a measured DC output voltage and the measured current;
wherein the current control loop comprises:
an error amplifier compensator receiving the measured current and the current set point and outputting the first signal; and
an inverting amplifier receiving the output power signal and outputting the second signal.

14. The dielectric barrier discharge power system according to claim 9, further comprising a processor configured to:
receive a measurement of a DC bus voltage and current supplied to the inverter stage, the measurement of the DC bus voltage and the current being scaled and multiplied together to provide a power feedback signal;
add the power feedback signal to a power set point; and
perform a digital error compensation using the power feedback signal and the power set point to output the current set point for the current control loop.

15. A method of generating dielectric barrier discharge, the method comprising:
providing an inverter stage and resonant tank for powering at least one dielectric barrier discharge cell; and
generating switching signals for the inverter stage using a control circuit, the switching signals including a phase shift for soft switching, wherein generating the switching signals comprises:
performing pulse width modulation (PWM) of a switching frequency of the switching signals to maintain an output current of the inverter stage at a current set point value; and
performing frequency modulation (FM) in parallel with performing the PWM, the FM increasing a switching frequency of the switching signals to reduce output power during a light load condition.

16. The method according to claim 15, wherein the switching signals have a frequency in a range of 20 kHz to 40 kHz.

17. The method according to claim 15, wherein performing the PWM comprises:
providing a PWM controller for generating the switching frequency for a gate driver, the PWM controller having a first input configured to receive a first signal for adjusting a duty cycle of the switching frequency to perform PWM and a second input configured to receive a second signal for adjusting a clock frequency time constant of the PWM controller to perform FM;
sensing an output current of the inverter stage;
comparing the output current to a current set point by performing error amplifier compensation; and
using the error amplifier compensation as the first signal.

18. The method according to claim 17, wherein performing the FM comprises:
inverting the error amplifier compensation using an inverting amplifier, the inverting amplifier outputting the second signal.

19. The method according to claim 18, wherein performing the FM further comprises:
adjusting a gain of the inverting amplifier.

20. The method according to claim 17, further comprising:
receiving a measurement of a DC bus voltage supplied to the inverter stage and a measurement of a DC bus current supplied to the inverter stage, the measurements of the DC bus voltage and the DC bus current being scaled and multiplied together to provide a power feedback signal;
adding the power feedback signal to a power set point; and
performing a digital error compensation using the power feedback signal and the power set point to output the current set point.

* * * * *

UNITED STATES PATENT AND TRADEMARK OFFICE
CERTIFICATE OF CORRECTION

PATENT NO.        : 8,680,777 B2          Page 1 of 1
APPLICATION NO.   : 13/431521
DATED             : March 25, 2014
INVENTOR(S)       : Tran et al.

It is certified that error appears in the above-identified patent and that said Letters Patent is hereby corrected as shown below:

In the Specification

Column 5,
Line 32, "voltage $V_{AC}$" should read --voltage $V_{DC}$--.

Column 6,
Line 58, "$Gfbk(s)=Gfbk_{DC}*1/(s/2*\pi*fp\lambda+1)$." should read
--$Gfbk(s) = Gfbk_{DC} *1/(s / 2 * \pi * fp\chi +1)$--.

Column 7,
Line 67, "$Kib(s)=Kib_{Dc}*1/(s/2*\pi*fp\varphi+1)$." should read
--$Kib(s)=Kib_{DC} *1/(s / 2 * \pi * fp\varphi +1)$--.

Column 9,
Line 16, "$(V_{AC}$" should read --$(V_{DC}$--.

Signed and Sealed this
Twenty-fourth Day of June, 2014

Michelle K. Lee
*Deputy Director of the United States Patent and Trademark Office*